United States Patent Office 3,259,433
Patented July 5, 1966

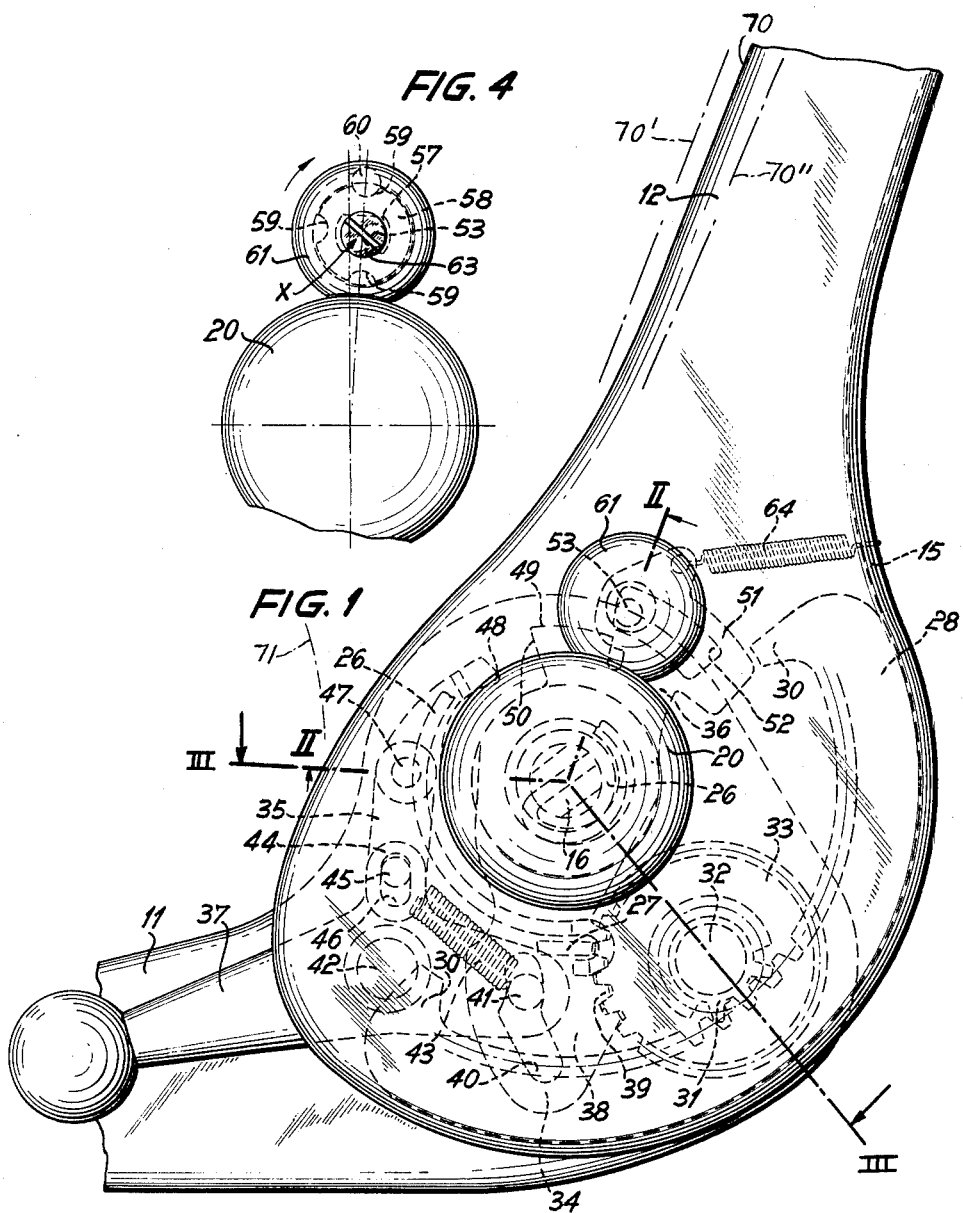

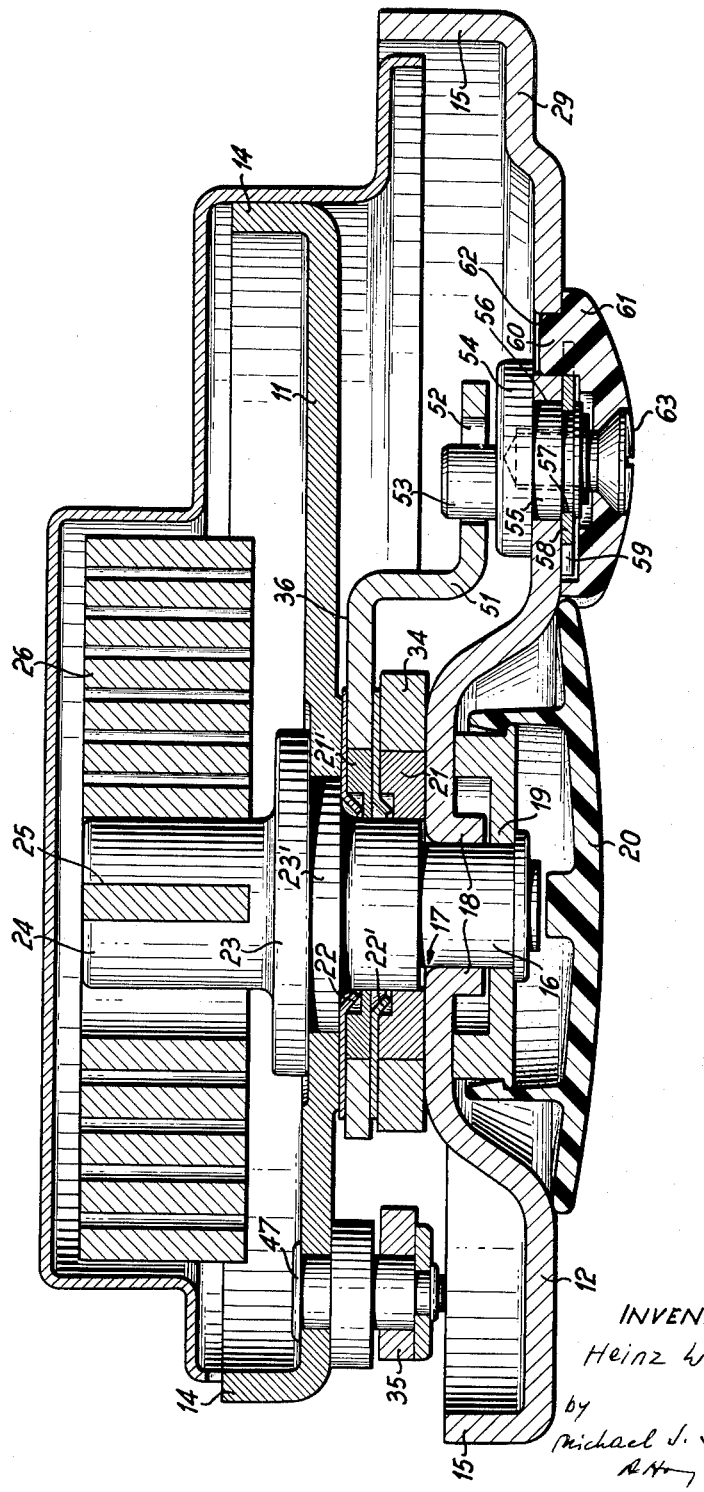

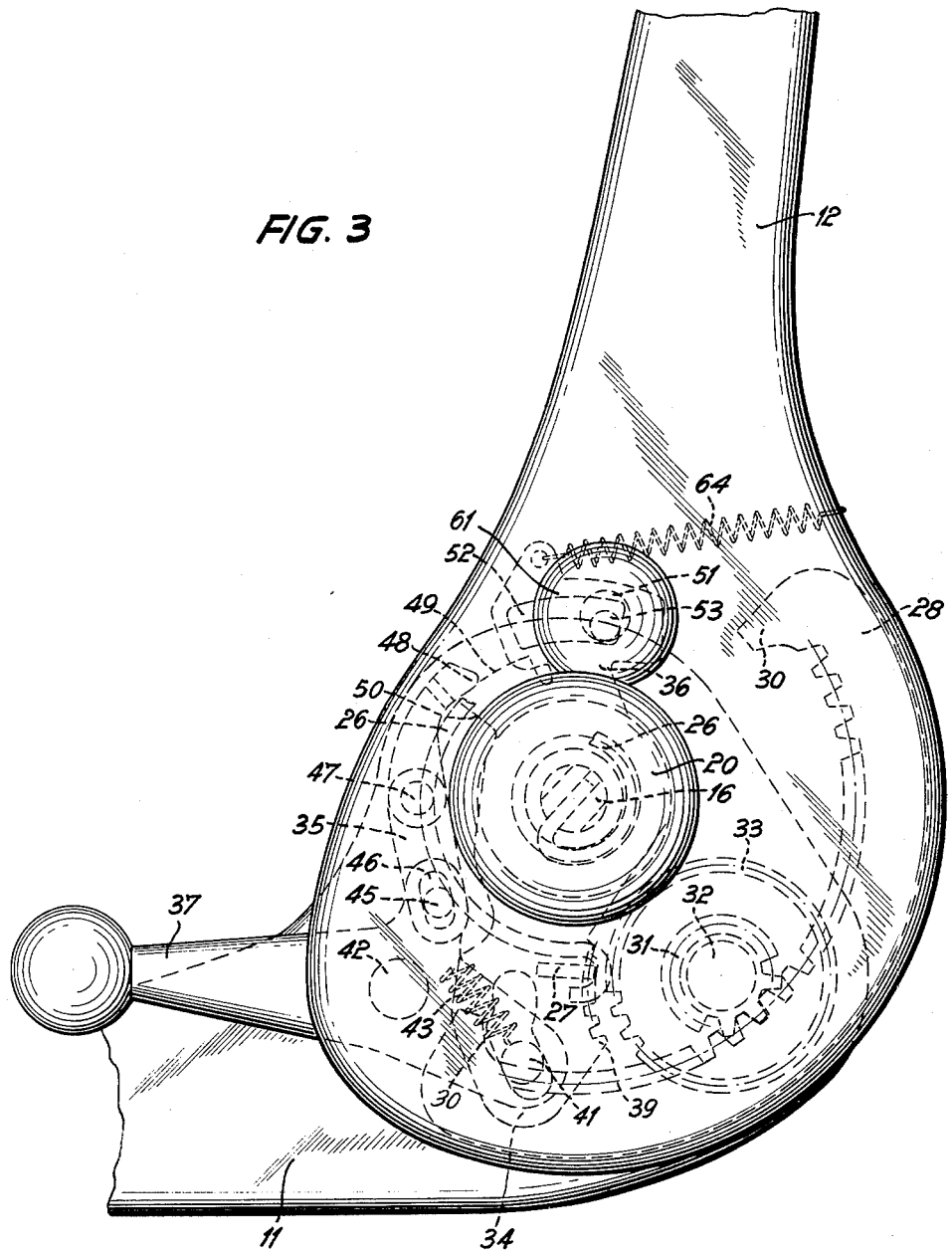

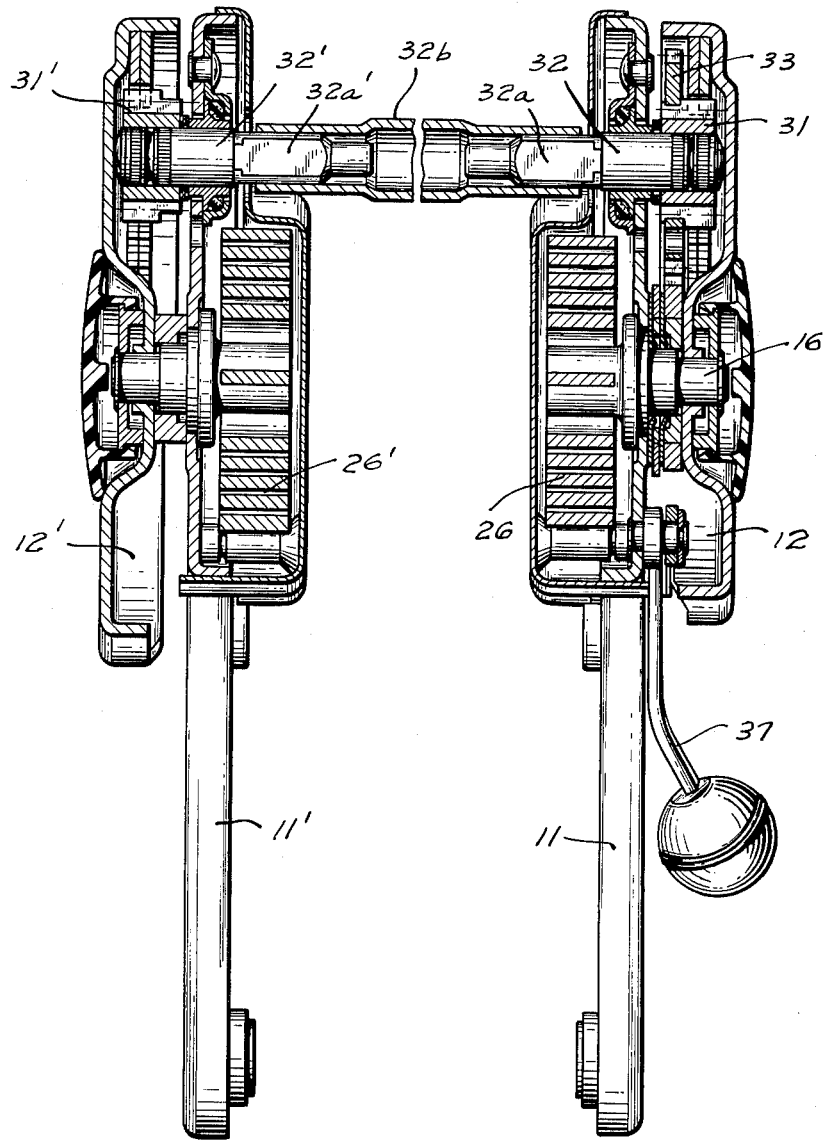

3,259,433
HINGE FITTING FOR ADJUSTABLE BACK RESTS, ESPECIALLY FOR MOTOR VEHICLES
Heinz Werner, Remscheid-Hasten, Germany, assignor to Fritz Keiper, Remscheid-Hasten, Germany, a firm
Filed Sept. 13, 1961, Ser. No. 137,874
Claims priority, application Germany, Dec. 27, 1960, K 42,515
18 Claims. (Cl. 297—367)

This invention relates to a hinge fitting for adjustable back rests, especially for motor vehicles.

In the known arrangements of this type the back rest can tip forwards or backwards in the event of acceleration of the motor vehicle.

It is the object of the present invention to overcome these disadvantages and to provide a hinge fitting which is simple and cheap and which will effectively and efficiently serve to adjustably connect a seat and a back rest.

The invention provides a hinge fitting for adjustable back rests, especially for motor vehicles, which comprises in combination two pairs of hinge parts, a pivot pin connecting the hinge parts of each pair adapted to be secured to one side of a seat and a back rest so that the latter can be swung from a selected position into an elected position, a toothed segment secured in one of the hinge parts of each pair, a pinion rotatably mounted in the other hinge part of each pair and engaging in the toothed segment, a toothed wheel rigidly connected with each pinion, a locking device for locking the back rest in the elected position, said locking device including a locking lever arranged to lock said toothed wheel, a hand lever to actuate said locking lever, an intermediate or control lever also controllable by said hand lever and arranged to cooperate with said locking lever, and a locking or blocking member rotatable about said pivot pin and arranged also to cooperate with said locking lever.

The back rest can be locked in the desired position so that it can move neither forwards nor backwards in the case of maximum acceleration, when the hand lever is released, the back rest can be swung forwards or backwards into any desired position.

Furthermore, it is also possible to make the locked position of the back rest adjustable within certain limits. The adjustment is preferably effected by means of an eccentric which can be brought by hand into different engaging positions by means of a disk. To obtain a fine adjustment, the locking device does not engage in the pinion cooperating with the toothed segment but in a supplementary toothed wheel which has a relatively large diameter as compared with the pinion. This toothed wheel can be rigidly connected with the pinion or with a shaft rigidly connecting both pinions.

A preferred embodiment of the invention will now be described by way of example and with reference to the accompanying drawings, in which:

FIG. 1 is an elevational view of a hinge fitting with a locking device according to the invention, arranged on the left side of a vehicle seat;

FIG. 2 is a sectional view taken on line II—II of FIG. 1;

FIG. 3 is a view similar to FIG. 1 but showing the locking device in a different position;

FIG. 4 is an elevational view of the adjustment means; and

FIG. 5 is a sectional view taken on line III—III of FIG. 1 in the direction of the arrows and showing only the hinge fitting with locking device adapted to be arranged on the left side of a vehicle seat and the corresponding hinge fitting adapted to be arranged on the right side of the vehicle seat and the connection therebetween.

The drawings show only those parts of an adjustable hinge fitting which are essential for the understanding of the invention. Therefore the seat and the back rest have been omitted as well as the connecting members between the two hinge fittings which are of conventional construction.

As shown in FIG. 1, a hinge fitting according to the invention consists of two adjustably connected hinge parts 11 and 12, the hinge part 11 being fixed on the seat and the hinge part 12 being fixed on the back rest. The hinge parts 11 and 12 are of dish shape and each provided with a peripheral upstanding edge 14 and 15, respectively, as shown in FIG. 2. The hinge parts 11 and 12 are fixed on the seat and back rest respectively by means of screws, or the like, passing through portions (not shown) of the hinge parts 11 and 12 extending towards the left and upwards in FIGS. 1 and 3. The hinge part 12 can be swung with respect to the hinge part 11 through the intermediary of a pivot pin 16 passing through bores in the hinge parts. The pivot pin 16 has one end of its shank flattened on opposite sides so as to form two parallel side surfaces 17 and is positively connected with the hinge part 12 by means of a collar 18 formed in the latter (FIG. 2). A disk 19 is connected to the pivot pin 16 by means of a tongue and groove or the like. This disk 19 bears against the hinge part 12 within an annular depression thereof, which depression is covered by a cap 20 of resilient material, preferably synthetic plastic. The pivot pin 16 carries two rings 21, 21' which are fitted with spacer disks 22, 22' between the hinge parts 11 and 12. The spacer disks 22, 22' and the rings 21, 21' can be fixed on the hinge part 12 and on the pin 16 by riveting or by a parallel key. The pivot pin 16 has a flange 23 which is stepped corresponding to the bore in the stationary hinge part 11, so that the pivot pin 16 can be pivoted in the bore of the stationary hinge part 11.

The opposite end, designated by reference numeral 24, of the pivot pin 16 projects through the stationary hinge part 11 and is provided with a slot 25 which accommodates one end of a spiral spring 26 which is suitably bent off for this purpose. The other end of the spiral spring 26 bears against a tongue 27 bent out from the hinge part 11. The spiral spring 26 is so arranged that it effects the swinging forward of the back rest through the intermediary of the pivot pin 16, that is the back rest tends to swing forward into its withdrawn position after the release of a locking device to be hereinafter described.

As shown in FIG. 1, on the rear side of the hinge part 12 a toothed segment 28 is fixed which may be composed of a plurality of curved sheet metal plates which bear with their outer edges against the peripheral upstanding edge 15 of the hinge part 12. A nose 30 at each end of the toothed segment 28 serves as abutment for a pinion 31 which is in mesh with the toothed segment 28 and secured to one end of an axle or shaft 32. As seen in FIG. 5, the hinge fitting 11', 12', adapted to be arranged on the right side of the vehicle seat is substantially identical to the hinge fitting 11, 12 on the left side of the seat except that the locking device according to the present invention is required on only one side and is therefore shown only on the left seat side. The axle 32 is rotatably mounted in the hinge part 11 as shown in FIG. 5, and has its other end 32a projecting from the hinge part 11. This latter end terminates in a square. This square end 32a' of the axle 32 and the corresponding square end of the other axle 32' projecting from the corresponding hinge part 11' on the other side of the seat may be rigidly connected by means of a tube 36b so as to form a common shaft for the two pinions 31 and 31'.

A toothed wheel 33 is rigidly mounted on the common shaft 32, 32b, 32' or directly on the pinion 31. In the latter case the toothed wheel 33 and the pinion 31 are joined together as a unit carried by the common shaft 32. The toothed wheel 33 has a larger diameter than the pinion 31 and is arranged to cooperate with a locking device which consists of a locking lever 34, an intermediate or control lever 35, a locking or blocking member 36 and a hand lever 37. The locking lever 34 and the blocking member 36 are rotatably mounted on the rings 21 of the pivot pin 16. The locking lever 34 has an arm 38 which engages by means of teeth 39 provided thereon in the teeth of the toothed wheel 33 so as to securely hold the latter. The locking lever 34 is provided at the lower end of its arm 38 with a guide groove 40 in which a projecting pin 41 on the hand lever 37 engages. This hand lever 37 is swingable about a bearing 42 and loaded by a tension spring 43 fixed at one end to the pin 41 of the hand lever 37 and at the other end to a bolt, not shown, fixed at the hinge part 11. The spring 43 is under initial tension so that it always tends to urge the hand lever 37 into the position shown in FIG. 1.

The hand lever 37 has on an arm 44 a projecting pin 45 which engages in a guide groove 46 in the control lever 35. This control lever 35 is rotatably mounted on a bolt or pivot 47 projecting from the hinge part 11 and terminates in a bent-over nose 48. This bent-over nose 48 is arranged to cooperate with the blocking member 36 which has a bevel or cam surface 49 and a notch 50 for the reception of the bent-over nose 48. An offset 51 with an elongated slot or guide track 52 is provided on the blocking member 36. This guide track 52 is in engagement with a bolt or pin 53 which is eccentrically mounted, as shown in FIG. 4, on a collar 54, see FIG. 2. This collar 54 carries in the middle a pin 55 which is rotatably mounted in a bore 56 in the hinge part 12 and has at its end a parallel key 57 on which a disk 58 is mounted. The disk 58 (FIG. 4) has its periphery provided with three recesses 59 in which can engage a cam 60 which is arranged on the rear side of a cap 61 and engages in a bore 62 in the hinge part 12. The cap 61 is connected with the pin 55 by means of a slotted screw 63.

After loosening the screw 63, the cap 61 can be removed and the disk 58 in the bore 56 turned about the pin 55 by hand. FIG. 2 shows the bolt 53 in centric position. On the disk 58 being turned through 90° in the direction of the arrow in FIG. 4, the bolt 53 is turned into the eccentric position. The dial 58 is locked in position by the cam 60 engaging in the bore 62 when the cap 61 is replaced. By turning the bolt 53, the abutment for the guide track 52 is shifted to provide for an adjustment of the driving position of the hinge part 12 and the back rest as later explained.

Referring now to the operation of the device, FIG. 1 illustrates the parts in full lines in an operative or driving position wherein the front surface of hinge member 12 is disposed as indicated at 70. A withdrawn or extreme forward position facilitating access to the rear seats of a vehicle will be reached when surface 70 is in the position 71 indicated by a broken line in FIG. 1. It it is desired to move the hinge member 12 and its back rest from the operative or driving position 70 to the withdrawn or extreme forward position 71, it is merely necessary to lift the hand lever 37 which will disengage the locking lever 34 from wheel 33. Spring 26 will then cause the hinge member 12 and its back rest to swing forward until the lower nose 30 moving to the right in FIG. 1 engages pinion 31 and thus the extreme forward position 71 is reached. The eccentric pin mounted on hinge member 12 and bearing against the left-hand edge of slot 52 will take member 36 along. The cam 49 of member 36 will move under the nose 48 of the intermediate or control lever 35 since due to the lifting of hand lever 37 the intermediate lever 35 has been turned about its pivot 47 so that the nose thereof is at an elevated level. When the hand lever 37 is released, spring 43 will cause the hand lever 37 and intermediate lever 35 to turn slightly until the nose 48 engages the cam 49. Thus, the locking device will be held automatically in its released position, the locking lever 34 being disengaged from wheel 33. The parts are shown in this position in FIG. 3, except for the hinge member 12 with the pin 53 thereon as will presently be apparent.

To return the back rest to the operative or driving position 70, the back rest may readily be moved rearwardly against the pressure of spring 26 since the locking device is disengaged. As in conventional devices, the back rest may be moved rearwardly either manually or by the back of a person occupying the front seat and leaning backwards. The hinge member 12 will first move without the blocking member 36 as the elongated slot 52 end provides for lost motion of pin 53 within the slot. Spring 64 is tensioned due to the backward movement of hinge member 12 so as to bias member 36 to the right in FIG. 3, but the friction between nose 48 and cam 49 tends to hold member 36 in place. If member 36 starts to move slightly, the frictional force will be increased and member 36 will be definitely stopped since as shown in FIGS. 1 and 3, the cam surface 49 is eccentric with respect to the axis of blocking member 36 and thus rises outwardly at its end facing the intermediate lever 35. This will prevent the cam 49 from being pulled out of engagement with nose 48 by spring 64 at this time.

When the hinge member 12 reaches the intermediate position shown in FIG. 3, however, pin 53 will contact the edge of slot 52 at the end thereof shown at the right in FIG. 3 so that the blocking member 36 will now be taken along and positively pulled out of engagement with nose 48. As soon as the nose 48 leaves the cam 49 and drops into the recess or notch 50, spring 43 will cause lever 37 to turn about its bearing 42, and lever 34 will then automatically lock the parts in the desired operative or driving position. In this manner, it is achieved that each time the hinge member 12 is swung back, it will reach the desired position again and will be securely locked therein. Spring 64 will cause member 36 to return to the position shown in FIG. 1.

If the eccentric pin 53 is turned to a different position, it will engage the right-hand edge of slot 52 at an earlier or later stage of the return movement so that the nose 48 will be positively disengaged from cam 49 at corresponding times. This will result in desired changes in the locked or driving position of the back rest.

For example, an adjustment to the extent of the eccentricity x in the direction of the arrow in FIG. 4 may be effected, but an adjustment is also possible in the opposite direction, so that a relatively large angle range and possibility of swing is attained in the driving position of the back rest. In the embodiment shown, the arrangement is such that an adjustment of the back rest through 2.5° corresponds approximately to the eccentricity x. The back rest is adjustable forwards or backwards by this amount with the aid of the recesses 59 provided in the disk 58, so that different driving positions can be obtained; the forward adjustment can serve for example as steep position allowing a better sight in the event of fog. Thus, while the full line 70 in FIG. 1 shows the normal driving position, the broken line 70' indicates a driving position adjusted for conditions such as fog or rain, and the broken line 70'' indicates a position for relaxed driving under optimum conditions. In each of these driving positions the locking is positively ensured through the intermediary of the blocking member 36. In the illustration of FIG. 4, the center of the bore 56 for the pin 55 is positioned on a radius of cap 20 inclined by about 4.5° to the vertical through the center of cap 20. This angle can naturally be adapted to the desired driving position and the different types of motor vehicles.

After releasing the hand lever 37, the back rest can be swung into any desired position. The extreme rest or reclining position (not shown) is reached when the upper nose 30 engages the wheel or pinion 31, while as indicated hereinbefore the extreme forward position 71 is reached upon engagement of the lower nose 30 with pinion 31.

As already mentioned, the construction shown is only an example of how the invention can be put into practice. The invention is, however, not restricted thereto, but, as the above description shows, many modifications of the construction illustrated and also other forms of construction are possible. For example the arrangement might be such that the disk 58 is rotatable by the cam 60 of the cap 61. The guide grooves 40 and 46 and the pins 41 and 45 might be interchanged and coordinated with the levers 35, 37 and to the arm 38. The levers might also be two-armed instead of one-armed.

I claim:

1. A hinge fitting for adjustable back rests, especially for motor vehicles, comprising in combination two pairs of hinge parts, a pivot pin connecting the hinge parts of each pair adapted to be secured to one side of a seat and a back rest so that the latter can be swung from a selected position into an elected position, a toothed segment secured in one of the hinge parts of each pair, a pinion rotatably mounted in the other hinge part of each pair and engaging in the toothed segment, a toothed wheel rigidly connected with the pinion, a locking device for locking the back rest in the elected position, said locking device including a locking lever arranged to move between an engaging position in which said lever locks said toothed wheel and a disengaging position in which said toothed wheel is released, a hand lever operatively connected with and arranged to move said locking lever between said positions, a control lever operatively connected to said hand lever and arranged to move from a first to a second position in response to movement of said locking lever from said disengaging to said engaging position, and a blocking member rotatable about said pivot pin and arranged to engage one of said hinge parts to be moved by said hinged part into and out of a position where said blocking member blocks said control lever and maintains said control lever in said first position whereby said hand lever is prevented from moving said locking lever to its engaging position.

2. A hinge fitting as claimed in claim 1, wherein a rigid shaft connects the pinions and the toothed wheels are secured to said shaft.

3. A hinge fitting as claimed in claim 1, wherein said control lever is rotatably supported by the hinge part of the seat and said locking lever is rotatably supported by the pivot pin connecting both hinge parts, said levers being provided with guide grooves and said hand lever being provided with projecting pins arranged to engage the respective grooves.

4. A hinge fitting as claimed in claim 1, wherein a nose is provided on the control lever and a guide surface and a notch are provided on the blocking member, said nose being arranged to alternatively cooperate with the guide surface or with the notch.

5. A hinge fitting as claimed in claim 4, wherein the blocking member has abutments which cooperate with an adjusting member fixed on the hinge part for the back rest.

6. A hinge fitting as claimed in claim 5, wherein the adjusting member is constructed as an eccentric.

7. A hinge fitting as claimed in claim 6, wherein a rotatable disk provided with notches in its periphery is provided for effecting adjustment of the eccentric.

8. In a hinger fitting for adjustably connecting a seat and back rest, in combination, a first hinge member adapted to be connected to the seat; a second hinge member adapted to support a back rest and articulately mounted on said first hinge member for movement jointly with said back rest between a forwardly withdrawn and a rear operative position; releasable locking means cooperating with said hinge members and movable between a released position in which said hinge members are freely movable relative to each other and a locking position in which said hinge members are prevented from moving relative to each other; holding means for automatically holding said locking means in said released position thereof during movement of said second hinge member and said back rest between said forwardly withdrawn and said rear operative positions and while said back rest is in said forwardly withdrawn position thereof, so that said locking means is permitted to move into and be in said locking position thereof only when said back rest is in said rear operative position thereof; actuating means for automatically moving said locking means from said released position into said locking position thereof when said second hinge member and back rest reach said operative position thereof; and biasing means for urging said second hinge member together with said back rest to move toward said withdrawn position thereof whenever said locking means is in said released position thereof.

9. In a hinge fitting for adjustably connecting a seat and a back rest, in combination, a first hinge member adapted to be connected to the seat; a second hinge member adapted to support a back rest and articulately mounted on said first hinge member for movement jointly with said back rest between a forwardly withdrawn and a rear operative position; releasable locking means cooperating with said hinge members and movable between a released position in which said hinge members are freely movable relative to each other and a locking position in which said hinge members are prevented from moving relative to each other; holding means for automatically holding said locking means in said released position thereof while said second hinge member and back rest are in said forwardly withdrawn position and during movement of said second hinge member and back rest between said forwardly withdrawn and said rear operative positions thereof, so that said locking means is permitted to move into and be in said locking position thereof only when said back rest is in said rear operative position thereof; actuating means for automatically moving said locking means from said released position into said locking position thereof when said second hinge member and back rest reach said operative position thereof; and spring means operatively connected to said second hinge member for urging said second hinge member together with said back rest to move toward said withdrawn position thereof whenever said locking means is in said released position thereof.

10. In a hinge fitting for adjustably connecting a seat and a back rest, in combination, a first hinge member adapted to be connected to said seat; a second hinge member adapted to support a back rest and articulately mounted on said first hinge member for movement jointly with said back rest between a forwardly withdrawn and a rear operative position; a locking lever cooperating with said hinge members and movable between a released position in which said hinge members are freely movable relative to each other and a locking position in which said hinge members are prevented from moving relative to each other; a hand lever connected to said locking lever and operable to move said locking lever from said locking to said released position for movement of said second hinge member and back rest between said forwardly withdrawn and said rear operative positions and while said back rest is in said forwardly withdrawn position thereof, so that said locking means is permitted to move into and be in said locking position thereof only when said back rest is in said rear operative position thereof; holding means connected to said hand lever for automatically holding said locking lever in said released position thereof while said second hinge member and back rest are in said withdrawn position thereof and while said second hinge member and back rest are returned to said operative position thereof; actuating means for automatically moving said locking lever from said released into said locking position thereof when said second hinge member and back rest reach said operative position thereof; and spring means operatively connected to said second hinge member for urging said second hinge member together with said back rest to move toward said withdrawn position thereof whenever said locking means is in said released position thereof.

11. In a hinge fitting for adjustably connecting a seat and a back rest, in combination, a first hinge member adapted to be connected to the seat; a second hinge member adapted to support a back rest and articulately mounted on said first hinge member for movement jointly with said back rest between a withdrawn and an operative position; a locking lever cooperating with said hinge members and movable between a released position in which said hinge members are freely movable relative to each other and a locking position in which said hinge members are prevented from moving relative to each other; a hand lever connected to said locking lever and operable to move said locking lever from said locking to said released position thereof for movement of said second hinge member and back rest from said operative position to said withdrawn position; an intermediate lever operatively connected to said hand lever; blocking means automatically engageable with said intermediate lever upon movement of said second hinge member and back rest to their withdrawn position for causing said hand lever to hold said locking lever in its released position until said hinge member and back rest are returned to said operative position; and spring means operatively connected to said second hinge member for urging said second hinge member together with said back rest to move toward said withdrawn position thereof whenever said locking means is in said released position thereof.

12. In a hinge fitting for adjustably connecting a seat and a back rest, in combination, a first hinge member adapted to be connected to said seat; a second hinge member adapted to support said back rest and mounted on said first hinge member for pivotal movement about an axis jointly with said back rest between a withdrawn and an operative position; a locking lever pivotable about said axis and cooperating with said hinge members and movable between a released position in which said hinge members are freely movable relative to each other and a locking position in which said hinge members are prevented from moving relative to each other; a hand lever operable to release said locking lever for movement of said second hinge member and back rest from said operative position to said withdrawn position; an intermediate lever pivotally mounted on said first hinge member and operatively connected to said hand lever; a blocking member turnable about said axis and automatically engageable with said intermediate lever upon movement of said second hinge member and back rest to their withdrawn position for causing said hand lever to hold said locking lever in its released position until said hinge member and back rest are returned to said operative position; and spring means for urging said second hinge member together with said back rest to move toward said withdrawn position thereof when said locking lever is moved to its released position.

13. In a hinge fitting for adjustably connecting a seat and a back rest, in combination, a first hinge member adapted to be connected to said seat; a second hinge member adapted to support a back rest and articulately mounted on said first hinge member for movement jointly with said back rest between a forwardly withdrawn and a single rear operative position; setting means for adjusting said single operative position of said second hinge member and back rest; releasable locking means cooperating with said hinge members and movable between a released position in which said hinge members are freely movable relative to each other and a locking position in which said hinge members are prevented from moving relative to each other; holding means for automatically holding said locking means in said released position during the entire movement of said second hinge member and back rest when said back rest is in said single preadjusted rear operative position thereof between said forwardly withdrawn position and said single preadjusted rear operative position and while said head rest is in said forwardly withdrawn position thereof, so that said locking means is permitted to move into and be in said locking position thereof only when said back rest is in said single preadjusted rear operative position thereof; and actuating means for automatically moving said locking means from said released position into said locking position thereof when said second hinge member and back rest reach said operative position thereof.

14. In a hinge fitting for adjustably connecting a seat and a back rest, in combination, a first hinge member adapted to be connected to said seat; a second hinge member adapted to support said back rest and articuately mounted on said first hinge member for movement jointly with said back rest between withdrawn and a single adjustable operative position; a locking lever cooperating with said hinge members and movable between a released position in which said hinge members are freely movable relative to each other and a locking position in which said hinge members are prevented from moving relative to each other; a hand lever operable to move said locking lever to said released position thereof so that said second hinge member and back rest can move from a selected operative position to said withdrawn position; an intermediate lever operatively connected to said hand lever; a movable blocking member automatically engageable with said intermediate lever upon movement of said second hinge member and back rest to their withdrawn position for causing said hand lever to hold said locking lever in its released position; and actuating means for automatically moving said locking lever from said released position into said locking position thereof when said second hinge member and back rest reach said operative position thereof.

15. A combination as set forth in claim 14, including connecting means between said second hinge member and said movable blocking member for shifting said movable blocking member into engagement with said intermediate lever upon movement of said second hinge member to its withdrawn position.

16. In a hinge fitting for adjustably connecting a seat and a back rest, in combination, a first hinge member adapted to be connected to said seat; a second hinge member adapted to support said back rest and articulately mounted on said first hinge member for movement jointly with said back rest between withdrawn and selectable operative positions; a locking lever for arresting said second hinge member and back rest against movement relative to said first hinge member and seat; a hand lever operable to release said locking lever for movement of said second hinge member and back rest from a selected operative position to said withdrawn position; an intermediate lever operatively connected to said hand lever; a movable blocking member automatically engageable with said intermediate lever upon movement of said second hinge member and back rest to their withdrawn position for causing said hand lever to hold said locking lever in its released position until said hinge member and back rest are returned to said selected operative position; and connecting means of the lost motion type between said second hinge member and said movable blocking member for shifting said movable blocking member into engagement with said intermediate lever upon movement of said second hinge member to its withdrawn position.

17. A combination set forth in claim 16, wherein said connecting means includes an eccentric adjustably mounted on said second hinge member for determining said selectable operative positions, and wherein said blocking member is formed with an elongated slot accommodating said eccentric therein, said eccentric being engageable with the terminal walls of said elongated slot.

18. A combination as set forth in claim 17, including a spring for biasing said movable blocking member.

References Cited by the Examiner

UNITED STATES PATENTS

| | | | |
|---|---|---|---|
| 3,008,765 | 11/1961 | Tischler et al. | 297—367 |
| 3,051,526 | 8/1962 | Werner et al. | 297—367 |

FOREIGN PATENTS

| | | |
|---|---|---|
| 1,232,189 | 10/1960 | France. |
| 727,335 | 3/1955 | Great Britain. |

FRANK B. SHERRY, *Primary Examiner.*

DONLEY J. STOCKING, *Examiner.*

J. G. GILFILLAN, R. B. FARLEY,
*Assistant Examiners.*